United States Patent

[11] 3,549,905

[72] Inventor Lee D. Johnson
Rochester, Mich.

[21] Appl. No. 630,623
[22] Filed Apr. 13, 1967
[45] Patented Dec. 22, 1970
[73] Assignee Johnson Controls, Inc.
Rochester, Mich.
a corporation of Michigan

[54] ELECTRONIC OSCILLATOR SWITCH
11 Claims, 2 Drawing Figs.

[52] U.S. Cl. ........ 307/252, 307/257, 307/308; 317/123, 317/146; 331/65, 331/117; 340/258
[51] Int. Cl. ........ H03k 17/00
[50] Field of Search ........ 307/252, 247, 257, 308; 328/5; 317/123(P), 146; 340/258; 331/65

[56] References Cited

UNITED STATES PATENTS

| | | | |
|---|---|---|---|
| 3,147,408 | 9/1964 | Yammoto et al. | 331/65X |
| 3,200,306 | 8/1965 | Atkins et al. | 317/123UX |
| 3,275,897 | 9/1966 | Atkins | 307/252X |
| 3,287,617 | 11/1966 | Robinson | 307/257X |
| 3,334,244 | 8/1967 | Hanchett | 307/252X |
| 3,422,415 | 1/1969 | Ichimori | 317/146X |

*Primary Examiner*—Donald D. Forrer
*Assistant Examiner*—J. D. Frew
*Attorney*—Harness, Dickey and Pierce

ABSTRACT: An electronic switch using an oscillator circuit and having only two leads including input and output with the oscillator circuit being placed in an oscillating and a nonoscillating condition, for providing a trigger signal, in response to actuation of a feedback circuit which includes probe means for affecting the feedback circuit.

PATENTED DEC 22 1970

3,549,905

INVENTOR.
Lee D. Johnson
BY
Harness, Dickey & Pierce
ATTORNEYS

ELECTRONIC OSCILLATOR SWITCH

SUMMARY BACKGROUND OF THE INVENTION

The present invention relates to an electronic switch, and more specifically, to an electronic switch which is contactless and in which switching is performed by means of an antenna.

With mechanically actuated contact type switches, the contacts will wear and eventually require replacement. It is an object of the present invention to provide a novel contactless type switch.

Also with such mechanical switches other moving parts are used which parts can be subject to wear; it is another object of the present invention to provide a novel switch having no moving parts.

It is another object of the present invention to provide an electronic switch which is actuated by means of an antenna.

The switch of the present invention requires only two leads for input to the switch and for the output to a load. Therefore, it is an object of the present invention to provide an electronic switch which requires only two leads. It is a further object to provide an electronic switch for use with AC potential which requires only two leads.

Figure 1:
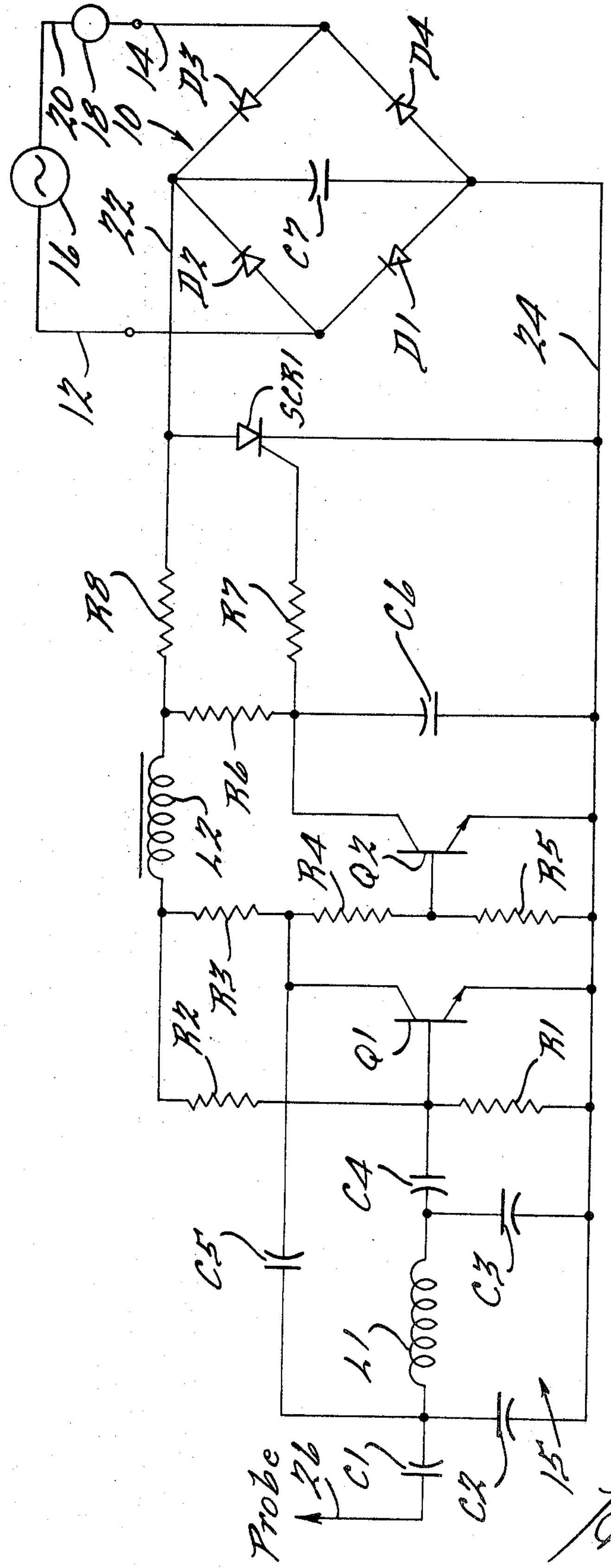
Figure 2:
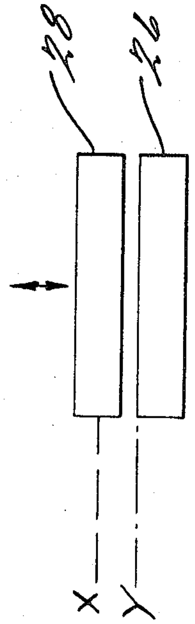

Other objects, features and advantages of the present invention will become apparent from the subsequent description and the appended claims, taken in conjunction with the accompanying drawing in which:

FIG. 1 is an electrical schematic diagram illustrating one form of the circuit of the switch of the present invention; and FIG. 2 is a drawing depicting a probe and actuating element for use with the circuit FIG. 1.

Looking now to FIG. 1, diodes D1—D4 are connected into a full wave rectifying bridge 10 having opposite sides connected to conductors 12 and 14 respectively. Conductor 12 is connected directly to an AC potential source 16 while conductor 14 is connected to source 16 via load 18 and conductor 20. The load 18 can be, for example, a relay coil. The bridge 10 has a conductor 22 connected to the positive side of its output and a conductor 24 connected to the negative or ground side. A high frequency capacitor C7 is connected across the bridge output conductors 22 and 24 to bypass transients for a purpose to be seen. The bridge output at conductors 22 and 24 is a direct potential, pulsating at twice the frequency of source 16.

Q1 is an NPN type transistor having base, collector, and emitter electrodes with the base being connected to the positive conductor 22 by means of a bias resistor R2, choke L2 and dropping resistor R8 and is connected to the ground or negative conductor 24 by a resistor R1. The emitter is connected directly to negative conductor 24. The transistor Q1 has its collector connected to the positive conductor 22 by means of a resistor R3, the choke L2 and dropping resistor R8 and is connected to negative conductor 24 through a pair of serially connected resistors R4 and R5. The transistor Q1 is connected for operation as an oscillator and hence its collector is connected to its base by means of a feedback circuit. The collector is connected directly to a feedback capacitor C5 which in turn is connected to a tank circuit 15 comprising an inductance L1 and a pair of capacitors C2 and C3. The tank circuit 14 is coupled to the base of transistor Q1 by means of a coupling capacitor C4. The tank circuit 15 is connected to the negative conductor 24 by means of capacitors C2 and C3.

By varying the magnitude of the capacitor C5, the amount of feedback to the tank circuit 15 can be controlled. The parameters of the tank circuit 15 are selected with regard to the other parameters of the circuit to provide oscillation of the transistor Q1 at a selected radio frequency.

An output transistor Q2 is of the NPN type and has its base connected to the juncture of resistors R4 and R5 and has its emitter connected to the ground conductor 24 and has its collector connected to the positive conductor 22 by means of a bias resistor R6 and the dropping resistor R8. A capacitor C6 is connected from the collector to ground and acts as an AC bypass for the selected radio frequency. The choke coil L2 is located between the resistors R3 and R6 and hence generally blocks the oscillations of the oscillator circuit of transistor Q1 from the succeeding circuitry.

The oscillator circuit of transistor Q1 is normally in an oscillating condition. An antenna or probe 26 is connected to the tank circuit 15 at the juncture of capacitor C2 and inductance L1 by means of a capacitor C1. The magnitude of the capacitor C1 and the length and shape of the antenna or probe 26 are selected such that upon contact with a noninsulator, the feedback characteristics to the tank circuit 15 will be so altered that oscillation will stop. Upon removal of the noninsulator from contact with the probe 26 oscillation will again commence. It is the change in oscillating condition of the circuit of transistor Q1 which, as will be seen, is sensed and is used to initiate a switching action.

The transistor Q1, when it is not in an oscillating condition, will have a lower output impedance than when it is oscillating and hence will provide a varying impedance across the resistors R4 and R5. Since oscillator transistor Q1 will normally be in oscillation the output impedance of the circuit of Q1 will be such that output transistor Q2 will normally be maintained on or conductive. When the antenna 26 is contacted by a noninsulator the feedback to the tank circuit 15 will be reduced whereby Q1 is placed out of oscillation, and the output impedance of Q1 is reduced. At this point the resistors R4 and R5 along with the dropping resistor R3 are effective to bias the transistor Q2 off or to render ti nonconductive; the change in conductive condition of Q2 is used to provide an output signal which is taken from the collector of Q2 via a resistor R7 for affecting the conductive condition of a silicon controlled rectifier SCR 1.

The anode of SCR 1 is connected to positive conductor 22 while the cathode is connected to ground conductor 24. The gate of SCR 1 is connected to resistor R7 and is normally biased such that SCR 1 will be triggered into conduction when transistor Q2 is nonconductive. When the transistor Q2 is conducting, the bias at the gate of SCR 1 is held from reaching a sufficient magnitude to fire SCR 1 and SCR 1 is maintained nonconductive or off. The capacitor C6 acting as an AC bypass prevents transients from inadvertently firing SCR 1. The SCR 1 is a controlled conduction device which will be conductive only when the anode is positive relative to the cathode and when the proper trigger current flows in the gate-cathode circuit.

As noted the potential across conductors 22 and 24, and hence across the anode and cathode of SCR 1, is a pulsating direct potential having a frequency of twice line frequency (from source 16). The pulsating potential will be a series of rectified half sine waves which reach zero potential at the end of each half wave. Thus the gate can regain control each half cycle since conduction of the anode and cathode will be terminated each time the pulsating potential reaches zero.

When the SCR 1 is turned on, substantially the full alternating potential from the source 16 will be impressed through SCR 1 and bridge 10 across the load 18 and the load 18 will be energized. With the SCR 1 conductive the impedance of the switching circuit as seen by the source 16 is low compared to the load impedance. However, with SCR 1 nonconductive the impedance of the switching circuit as seen by the source 16 is very high relative to the impedance of the load 18. In either condition, current will flow through load 18; however, in the latter condition the current will be of such a low amplitude as not to be objectionable; for example if load 18 is a relay coil the current flow with SCR 1 off will be insufficient to actuate the relay.

The oscillator circuit of transistor Q1 can be turned off merely by touching the probe or antenna 26. By properly selecting the parameters of the circuit and by designing the shape of probe 26 the oscillator circuit can be turned off without physically touching the probe 26 but rather by merely moving the noninsulator, actuating element proximate to the probe 26.

FIG. 2 shows an example of a probe 26 and an actuating element 28 which is moved towards and away from probe 26 as shown by the arrows. In FIG. 2 it is assumed that the oscillator will be turned off when element 28 is located at $x$ distance from the surface $y$ of probe 26. With such a construction the oscillator circuit will be turned off and maintained off while the actuating element 28 moves from $x$ to $y$ and back to $x$ again. Thus the "on" time for SCR 1 and hence the time when the load 18 will be energized can be varied by varying the sensitivity of the oscillator circuit relative to the shape of the probe 26 and actuating element 28.

Note that with the circuit as shown the conductors 12 and 20 (and hence 14) carry the output or load current for the load 18 (through SCR 1 and bridge 10) and also the same two conductors 12 and 20 carry the input or energizing current for the oscillator circuit of transistor Q2. Thus the switching circuit of FIG. 1 can be directly substituted for a mechanical switch, with each requiring only two wires for connection to the source 16 and load 18; in addition, the switch of the present invention requires no moving parts.

In order to maintain the size of the components at a minimum, a high operating frequency for the oscillator circuit of transistor Q1 is desirable. It has been found that capacitor C5 and others of the components can be of a relatively small size when the parameters of the oscillator circuit of transistor Q1 are selected to operate at a frequency of 50 megacycles and generally no lower than 2 megacycles.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A switching circuit for connecting an output load to a source of alternating potential comprising: switching circuit means energized by an input current from the source and actuable responsively to a control signal for connecting the output load to the source through a low impedance circuit whereby an output current is transmitted from the source to the output load; circuit means connecting said switching circuit means to the source through the output load, said circuit means including conductor means comprising no more than two conductors for transmitting the input current from the source through the load to said switching circuit means and the output current to the output load; said circuit means including an oscillator circuit and means responsive to a change in impedance of said oscillator circuit between an oscillating and a nonoscillating condition for providing said control signal, said oscillator circuit including a feedback circuit and probe means connected to said feedback circuit and being selectively actuable independently of said output load for changing the oscillating condition of said oscillator circuit between nonoscillating and oscillating conditions whereby the condition of said oscillator circuit and hence the "on"–off" condition of said switching circuit means is controlled by actuation of said probe means, said circuit means including a full wave rectifier bridge having its input connected to said two conductors and having its output connected to said switching circuit means and to said oscillator circuit whereby said oscillator circuit is energized by pulsating direct current.

2. The switching circuit of claim 1 with said switching circuit comprising no moving parts.

3. The switching circuit of claim 1 with said probe means being actuable by being located proximate a noninsulator actuating member for reducing the effect of the feedback through said feedback circuit whereby said oscillator circuit ceases oscillating.

4. The switching circuit of claim 1 with said probe means being actuable by being engaged by a noninsulator actuating member for reducing the effect of the feedback through said feedback circuit whereby said oscillator circuit ceases oscillating.

5. The switching circuit of claim 1 including coupling means for substantially resistively coupling the pulsating direct current from said bridge to said oscillator circuit.

6. The switching circuit of claim 5 with said circuit means including a controlled conduction device having its principal electrodes connected across the output of said bridge and being rendered conductive responsively to said trigger signal.

7. The switching circuit of claim 6 with said controlled conduction device being a controlled rectifier having a gate electrode and with said oscillator circuit including a first solid state conduction device having a pair of main electrodes and a control electrode and with said feedback circuit including a tank circuit with said feedback circuit connected from one of said main electrodes and said control electrode, and with said switching circuit means including a second solid state conduction device having an output circuit connected to said gate electrode and an input circuit connected to said main electrodes of said first device, said second device having a first condition for providing said trigger signal and a second condition for not providing said trigger signal, said second device being in said first or second condition responsively to a change in impedance in said oscillator circuit between an oscillating and a nonoscillating condition.

8. The switching circuit of claim 7 with said probe means connected to said feedback circuit at said tank circuit by a high frequency capacitor.

9. The switching circuit of claim 5 with a high frequency capacitor connected across the input of said bridge.

10. The switching circuit of claim 9 with said probe means being locatable proximate a noninsulator actuating member for reducing the effect of the feedback through said feedback circuit whereby said oscillator circuit ceases oscillating.

11. The switching circuit of claim 10 with said probe means being actuable by being engaged by a noninsulator actuating member for reducing the effect of the feedback through said feedback circuit whereby said oscillator circuit ceases oscillating.